United States Patent
Klesse et al.

(10) Patent No.: US 8,057,698 B2
(45) Date of Patent: Nov. 15, 2011

(54) AQUEOUS N-METHYLOLMETHACRYLAMIDE-METHACRYLAMIDE MIXTURE

(75) Inventors: Wolfgang Klesse, Mainz (DE); Joachim Knebel, Alsbach-Haehnlein (DE)

(73) Assignee: Evonik Röhm GmbH, Darmstadt (DE)

( * ) Notice: Subject to any disclaimer, the term of this patent is extended or adjusted under 35 U.S.C. 154(b) by 0 days.

(21) Appl. No.: 12/092,507

(22) PCT Filed: Oct. 31, 2006

(86) PCT No.: PCT/EP2006/068000
§ 371 (c)(1),
(2), (4) Date: May 2, 2008

(87) PCT Pub. No.: WO2007/090475
PCT Pub. Date: Aug. 16, 2007

(65) Prior Publication Data
US 2008/0287629 A1    Nov. 20, 2008

(30) Foreign Application Priority Data

Feb. 9, 2006  (DE) .......................... 10 2006 006 200

(51) Int. Cl.
*C09K 3/00* (2006.01)
(52) U.S. Cl. ............ 252/182.18; 252/182.13; 526/303.1
(58) Field of Classification Search ............. 252/182.13, 252/182.18
See application file for complete search history.

(56) References Cited

U.S. PATENT DOCUMENTS

| | | | |
|---|---|---|---|
| 4,345,006 A * | 8/1982 | Loechel et al. | ............... 428/473 |
| 4,567,297 A * | 1/1986 | Ball et al. | ...................... 564/208 |
| 4,617,321 A | 10/1986 | MacDonald | |
| 7,521,578 B2 | 4/2009 | Schmitt et al. | |
| 2001/0005734 A1 | 6/2001 | Lau et al. | |
| 2007/0225398 A1 | 9/2007 | Knebel et al. | |
| 2008/0255372 A1 | 10/2008 | Schmitt et al. | |
| 2008/0300373 A1 | 12/2008 | Schmitt et al. | |
| 2009/0001322 A1 | 1/2009 | Wiesler et al. | |

FOREIGN PATENT DOCUMENTS

| | | |
|---|---|---|
| DE | 25 08 559 | 9/1975 |
| DE | 34 14 525 | 10/1985 |
| EP | 0 527 411 | 2/1993 |
| JP | 09 309867 | 12/1997 |

OTHER PUBLICATIONS

Written Opinion of the International Searching Authority (with English Translation).
International Preliminary Report on Patentability (IPER).
U.S. Appl. No. 11/995,406, filed Jan. 11, 2008, Schmitt, et al.
U.S. Appl. No. 12/088,093, filed Mar. 26, 2008, Schmitt, et al.
U.S. Appl. No. 12/093,744, filed May 15, 2008, Schmitt, et al.
U.S. Appl. No. 61/014,927, filed Dec. 19, 2007, Karnbrock.
U.S. Appl. No. 12/159,871, filed Jul. 2, 2008, Wiesler, et al.

* cited by examiner

*Primary Examiner* — Peter F Godenschwager
(74) *Attorney, Agent, or Firm* — Oblon, Spivak, McClelland, Maier & Neustadt, L.L.P.

(57) ABSTRACT

The invention relates to mixtures of methacrylamide and aqueous N-methylolmethacrylamide solution.

4 Claims, No Drawings

AQUEOUS N-METHYLOLMETHACRYLAMIDE-METHACRYLAMIDE MIXTURE

The invention relates to a mixture of aqueous N-methylolmethacrylamide solution and methacrylamide and to its uses.

Methacrylamide, as a polymerizable derivative of methacrylic acid, is known per se and is commercially available (CAS No. 79-39-0). A problem in the commercial handling of methacrylamide is its tendency to clump and to cake in solid form and to develop fine dust. This entails complicated apparatus for the handling and metering of the material at the place of use, for example lump breakers and suction removal devices with the accompanying filters. Acrylamide has neurotoxic and carcinogenic potential and is therefore used predominantly as an aqueous solution. This avoids contamination by dust formation and significantly reduces risks in the handling. Since methacrylamide too has a certain neurotoxic potential, it is desirable for this reason too to provide a liquid trade and shipping form for methacrylamide too. While acrylamide has a high water solubility and is commercially available as, for example, 40-50% solution, methacrylamide is soluble in water at 20° C. only to an extent of approx. 20% by weight.

In JP 57161196, a water-soluble copolymer is prepared from 70-95% by weight of methacrylamide and 5-30% by weight of N-methylolmethacrylamide. This copolymer is used as a binder. It features good viscosity stability and water resistance.

SU 806676 describes the preparation of methylolmethacrylamide. A melt of methacrylamide is reacted with paraformaldehyde in the presence of a basic catalyst.

Methacrylamide solutions in water have a low methacrylamide content, since the material is sparingly soluble in water.

Typically, the solutions marketed contain a maximum of approx. 16% methacrylamide at 20° C.

To increase the methacrylamide concentration in solution, for example, methacrylamide has been dissolved in methacrylic acid and water in DE 102004032766. This allows the methacrylamide content in the solution to be increased to above 35% by weight depending on the temperature. In order to prevent undesired premature polymerization, the solution is generally admixed with customary stabilizers. These include phenols such as hydroquinone and hydroquinone monomethyl ether, but also $Cu^{++}$ ions. Preference is given to hydroquinone monomethyl ether and $Cu^{++}$ ions. However, these stabilizers are undesired in some polymerization reactions. In addition, there is a multitude of uses of methacrylamide which cannot be performed in mixtures with methacrylic acid.

It was an object of the invention to provide a mixture with a higher methacrylamide content without methacrylic acid or stabilizers.

The object is achieved by a mixture comprising methacrylamide and aqueous N-methylolmethacrylamide solution.

It has been found that, surprisingly, a good solubility of methacrylamide in aqueous N-methylolmethacrylamide leads to a significant increase in the content of methacrylamide in solutions. It has been found that the content of methacrylamide in solutions can be almost doubled.

It has been found that the undesired side reaction of the formation of N,N'-methylenebis(methacrylamide) does not occur. It has additionally been found that the inventive mixtures have good storage stability.

The solubility of the methacrylamide in N-methylolmethacrylamide is dependent upon the temperature and the concentration of the aqueous N-methylolmethacrylamide solution.

Preference is given to using 20-70% N-methylolmethacrylamide solutions, particular preference to using 60% N-methylolmethacrylamide solutions.

At room temperature, up to 30% by weight of methacrylamide, preferably 20-25% by weight, can then be dissolved in N-methylolmethacrylamide solutions. At elevated temperature, the proportion of methacrylamide which goes into solution can be increased correspondingly.

For inexpensive storage and shipping, the maximum solubilities at room temperature are preferred.

The mixtures of methacrylamide in N-methylolmethacrylamide solutions are preferably used for subsequent crosslinking of dispersions.

The examples given below are given for better illustration of the present invention but are not capable of restricting the invention to the features disclosed herein.

EXAMPLES

Example 1

255 g of a 60% N-methylolmethacrylamide solution are initially charged in a round-bottomed flask at room temperature. 75 g of methacrylamide are added and the mixture is stirred for 1 hour.

A clear solution is obtained which does not comprise any N,N'-methylenebis(methacrylamide).

The invention claimed is:

1. A mixture, consisting of:
   methacrylamide and aqueous N-methylolmethacrylamide solution;
   wherein the mixture is obtained by dissolving 1-30% by weight of methacrylamide in a 60-70% by weight aqueous N-methylolmethacrylamide solution at room temperature.

2. The mixture according to claim 1, wherein said aqueous N-methylolmethacrylamide solution is a 60% by weight aqueous N-methylolmethacrylamide solution.

3. The mixture according to claim 1, wherein 20-25% by weight of methacrylamide is dissolved in said aqueous N-methylolmethacrylamide solution at room temperature.

4. The mixture according to claim 1, wherein 20-25% by weight of methacrylamide is dissolved in a 60% by weight aqueous N-methylolmethacrylamide solution at room temperature.

* * * * *